United States Patent [19]

Emmoto

[11] Patent Number: 5,334,911
[45] Date of Patent: Aug. 2, 1994

[54] APPARATUS FOR AND METHOD OF MEASURING BEAM SPOT LUMINESCENCE DISTRIBUTION

[75] Inventor: Kazuo Emmoto, Nagasaki, Japan

[73] Assignee: Mitsubishi Denki Kabushiki Kaisha, Tokyo, Japan

[21] Appl. No.: 857,316

[22] Filed: Mar. 25, 1992

[30] Foreign Application Priority Data

Jul. 24, 1991 [JP] Japan .................. 3-206219

[51] Int. Cl.⁵ ............... H01J 31/26; H04N 17/02
[52] U.S. Cl. ........................... 315/10; 348/189
[58] Field of Search ............ 315/10, 364, 408, 391; 358/10, 139

[56] References Cited

U.S. PATENT DOCUMENTS

| | | | |
|---|---|---|---|
| 2,595,646 | 5/1952 | Doba, Jr. et al. | 315/379 |
| 4,439,735 | 3/1984 | Alvite et al. | 358/10 |
| 4,602,272 | 7/1986 | Duschl | 358/10 |

FOREIGN PATENT DOCUMENTS

| | | |
|---|---|---|
| 61-154392 | 7/1986 | Japan . |
| 3-108235 | 5/1991 | Japan . |
| 3-174892 | 7/1991 | Japan . |

Primary Examiner—Gregory C. Issing
Attorney, Agent, or Firm—Burns, Doane, Swecker & Mathis

[57] ABSTRACT

The invention relates to a method and a device for measuring a luminescence distribution within a beam spot of an electron beam irradiated on a tube surface of a color cathode ray tube. The measuring region is fixed within the specific fluorescent substance of the tube surface. The irradiated locations of the electron beam are variably changed, satisfying the condition that the beam spot contains the measurement region. The luminescent brightness of the measurement region is measured at each irradiated location of the electron beam. Furthermore, the luminescence distribution of the beam spot is determined based on each luminescent brightness.

1 Claim, 7 Drawing Sheets

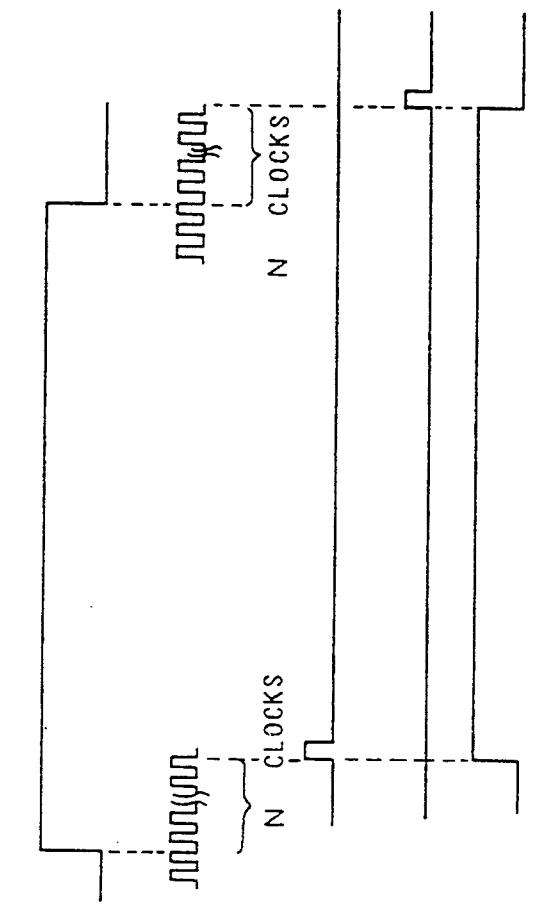
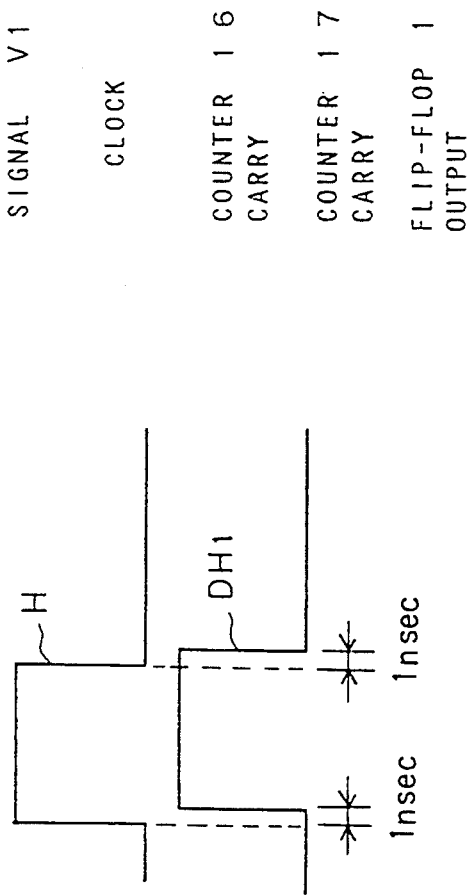

APPARATUS FOR AND METHOD OF MEASURING BEAM SPOT LUMINESCENCE DISTRIBUTION

BACKGROUND OF THE INVENTION

1. Field of the Invention

The present invention relates to a method for measuring beam spot luminescence distribution and a device therefor to measure luminescence distribution within a beam spot of an electron beam irradiated on a tube surface of a color cathode ray tube (hereinafter referred to simply as a "CRT").

2. Description of the Prior Art

FIG. 1 is a perspective view of the inside of a CRT according to a measuring method for beam spot luminescence distribution in the prior art. In FIG. 1, numeral 1 designates a tube surface serving as a display surface of the CRT. Numerals 2, 2a represent fluorescent substances for emitting red, green, and blue (R, G and B light) as picture elements applied to the tube surface 1. The hatched fluorescent substance 2a indicates picture element under luminescence. A shadow mask 3 is spaced a prescribed distance from the tube surface 1. Beam passing holes 4, 4a correspond to the fluorescent substances 2, 2a respectively. An electron beam is emitted from an electron gun (not shown). A beam spot 5a of the electron beam 5 is formed on the shadow mask 3 and a virtual beam spot 5b is formed responsive to the beam spot 5a.

An electron beam 5 emitted from an electron gun passes through a plurality of (four in the figure) holes 4a of a shadow mask 3 and irradiates a plurality of fluorescent substances 2a corresponding to the holes 4a causing the fluorescent substances 2a to luminesce. Accordingly, the brightness of each of these fluorescent substances 2a is measured and the luminescence distribution within one beam spot 5b can be determined.

FIG. 2 is a brightness distribution characteristic diagram of each fluorescent substance 2a when eight fluorescent substances 2a luminesce within the beam spot 5b. 2b correspond to respective fluorescent substances 2a. Data 6 composed of three discrete values derived from the characteristic diagram is compared with standard data shown in FIG. 3(A). If the shape of the data 6 is close to the shape shown in FIG. 3(B), the brightness is determined to be low, and if the shape of the data 6 is close to the shape shown in FIG. 3(C), the focus is determined to be low.

Since the measuring for beam spot luminescence distribution is carried out as mentioned above, the electron beam 5 is intercepted by the shadow mask 3, and only the beam passing through the holes 4a makes the fluorescent substances 2a luminesce as clearly seen from FIG. 1. Consequently, the luminescence distribution within the beam spot 5b is determined only by the sampling data correspond to the fluorescent substances 2a which luminesce. The brightness of a part associated with the electron beam 5 being intercepted by the shadow mask 3 cannot be determined. Therefore, in the case of a high resolution CRT with fine beam diameters, the number of data points able to be sampled becomes 3–4. Therefore highly accurate measurement cannot be carried out because the beam spot 5b is very small.

SUMMARY OF THE INVENTION

The present invention solves the above-mentioned problem by providing a measuring method for beam spot luminescence distribution and a device therefor in which a large amount of sampling data can be obtained.

A measuring method for beam spot luminescence distribution relating to the present invention, wherein phases of synchronous signals provided to a deflecting circuit of a CRT are controlled and an electron beam is moved to a plurality of positions, comprises several steps. These include the step of moving the electron beam into a beam spot so that the specific measurement region always exists within one specific fluorescent substance, and the step of measuring brightness for the measurement region in each of a plurality of positions.

A measuring device for beam spot luminescence distribution relating to the present invention comprises a synchronous signal phase control device for controlling phases of synchronous signals provided to a deflecting circuit. The electron beam moves to a plurality of positions while the specific measurement region for measuring the brightness in one selected fluorescent substance always exists within the beam spot of the electron beam in the tube surface of the CRT. The device also includes means for measuring the brightness of the measurement region in each position of the electron beam.

According to the present invention, the horizontal and vertical synchronous signals are deviated minutely whereby the beam spot can be minutely deviated longitudinally and laterally. Therefore, the beam spot is moved minutely to many positions and the luminescent brightness of the specific measurement region within the beam spot is measured for each position to obtain a large amount of sampling data.

BRIEF DESCRIPTION OF THE DRAWINGS

FIG. 9 is a waveform chart indicating the operation of the control device; and

FIG. 10 is a timing chart indicating the operation of the control device.

DETAILED DESCRIPTION OF THE PREFERRED EMBODIMENTS

An embodiment of the present invention will be described referring to the accompanying drawings as follows.

Figure 4:
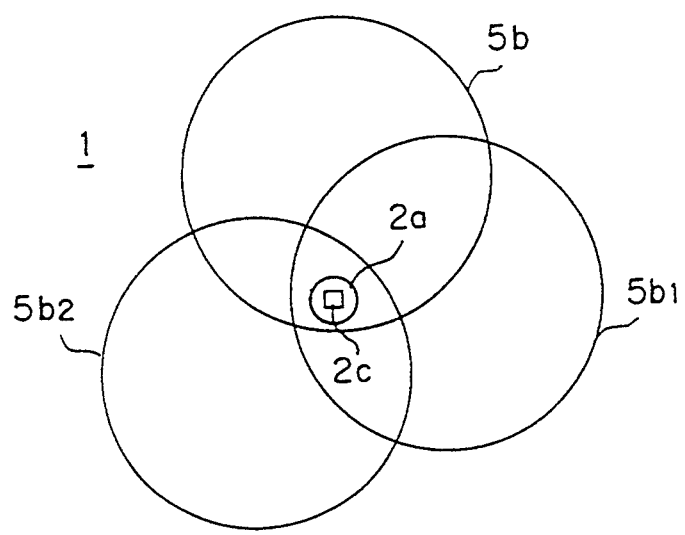
FIG. 4 is a diagram indicating the measurement principle according to a measuring method and device for beam spot luminescence distribution of the invention.

FIG. 4 is a diagram indicating the principle for a measuring method according to the invention.

In a tube surface 1 of a CRT, any one fluorescent substance 2a is selected and a measurement region 2c for measuring the luminescent brightness of the selected fluorescent substance 2a is determined. The central part of the fluorescent substance 2a having the highest luminescent brightness is selected as the measurement region 2c.

Next, an electron beam is emitted so that the fluorescent substance 2a is irradiated. FIG. 4 shows an example where the fluorescent substance 2a is situated on the lower part within the beam spot 5b, and the luminescent brightness of the measurement region 2c is measured. The electron beam is moved to the position $5b_1$, and the luminescent brightness of the measurement region 2c is measured. Subsequently, the electron beam is moved and the beam spot 5b is moved to the position $5b_2$, and the brightness of the measurement region 2c is measured.

Three measured brightness values obtained by the above-mentioned method are approximately equivalent to three luminescent brightness values obtained regarding one beam spot 5b. Accordingly, the beam spot 5b is moved minutely in the horizontal direction and the vertical direction so that the measurement region 2c remains within the beam spot. Thereby the brightness data for many locations within the beam spot 5b can be sampled.

In order to move the beam spot 5b, that is, the electron beam minutely in the horizontal direction and the vertical direction, the phases of the horizontal and vertical synchronous signals provided to the deflecting circuit of the CRT are controlled in this embodiment.

Figure 5:
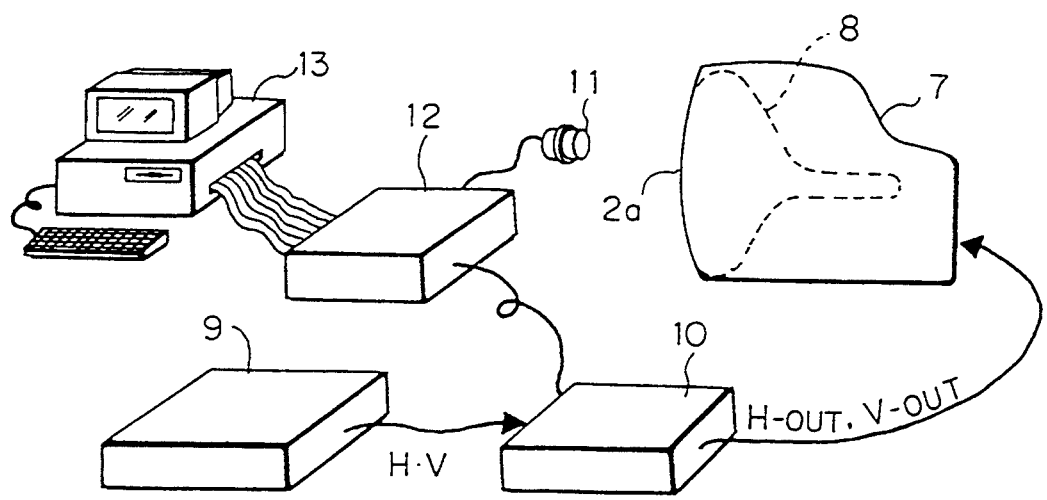
FIG. 5 is a diagram indicating a measuring device for beam spot luminescence distribution according to an embodiment of the invention.

FIG. 5 is a diagram showing an embodiment of the measuring device. In FIG. 5, the measuring device includes a monitor 7, a CRT 8 to be measured provided in the monitor 7, a general-purpose signal generator 9 for generating a horizontal synchronous signal H, a vertical synchronous signal V etc., and a synchronous signal phase control device 10 for controlling the phases of the synchronous signals H, V and supplying the signals to a deflecting circuit (not shown) of the monitor 7.

Also included are a CCD camera 11 represented as a brightness measuring means for measuring the brightness in the measurement region 2c of the fluorescent substance 2a of the CRT 8, a picture processing device 12 for processing picture signals obtained from the CCD camera 11, and a computer 13 such as a personal computer for controlling the synchronous signal phase control device 10 and the picture processing device 12.

Figure 6A:
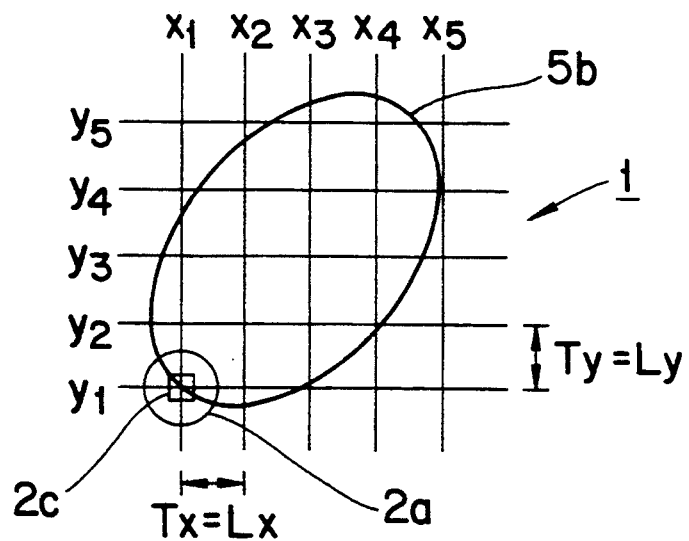
FIGS. 6A–6B is a diagram indicating a measuring method for beam spot luminescence distribution according to an embodiment of the invention.

As indicated in FIG. 6(A), the X-Y coordinates are fixed on the tube surface 1 of the CRT 8. The measurement region 2c of the fluorescent substance 2a is located at coordinates $(x_1, y_1)$. The horizontal and vertical synchronous signals H, V are phase-controlled and the beam spot 5b is controlled so that the measurement region 2c is located on its periphery. In FIG. 6, the beam spot 5b is illustrated in an elliptical form for convenience.

Figure 6B:
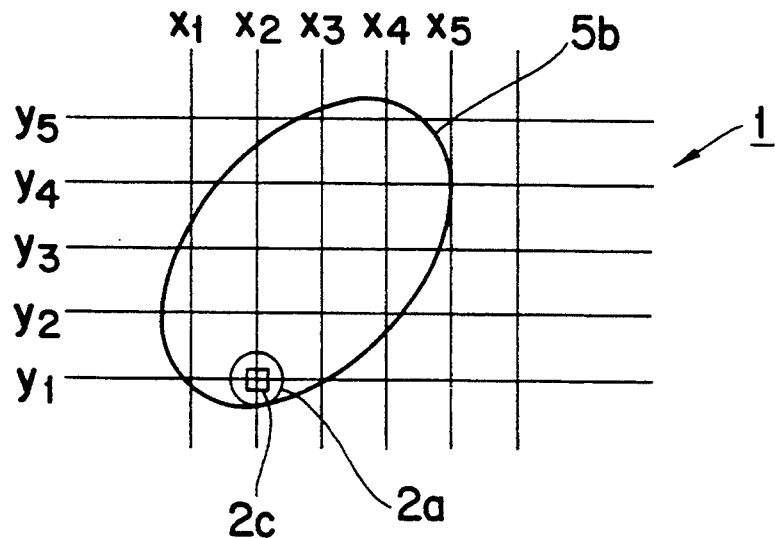
Figure 7:
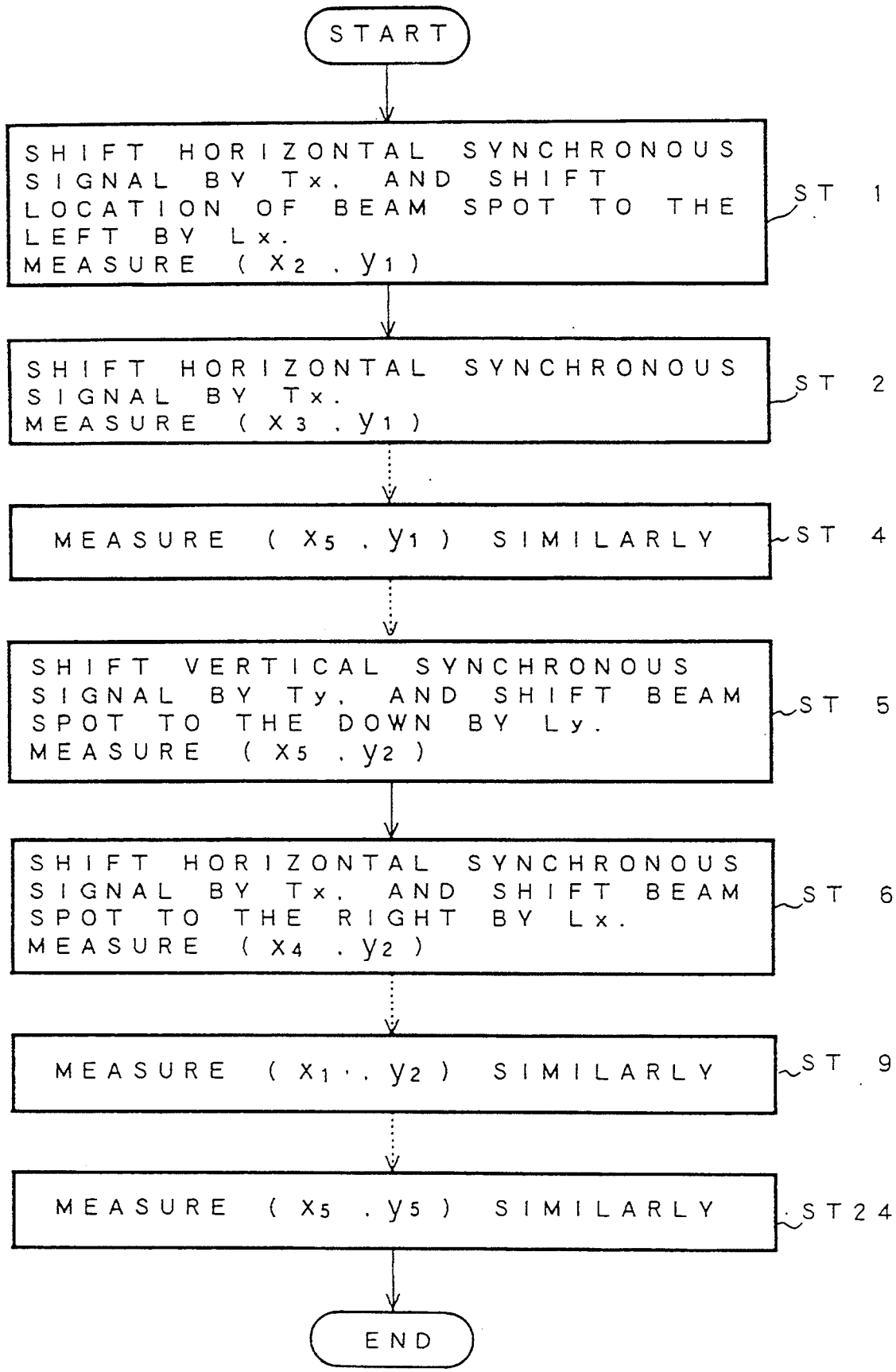
FIG. 7 is a flow chart indicating the procedure of the measuring method for beam spot luminescence distribution.

According to step ST1 in FIG. 7, the horizontal synchronous signal H is deviated by $T_X$ and the beam spot 5b is shifted to the left by $L_X$. As a result, the measurement region 2c is located at coordinates $(x_2, y_1)$ as shown in FIG. 6(B). In this state, the measurement region 2c is photographed by the CCD camera 11 and its brightness is measured. Subsequently according to step ST2, the horizontal synchronous signal H is further deviated by $T_X$ and the measurement region 2c is at coordinates $(x_3, y^1)$, and the brightness of the measurement region 2c is measured by the CCD camera 11. Similarly, according to steps ST3, ST4, the horizontal synchronous signals H is deviated by $T_X$ sequentially, whereby the measurement region 2c is located at each of the coordinates $(x_4, y_1)$, $(x_5, y_1)$ and the brightness of the measurement region 2c in each position is measured by the CCD camera 11.

Next, in step ST5, the vertical synchronous signal V is shifted by $T_y$. Thereby the beam spot 5b is deviated downwards by $L_y$. As a result, the measurement region 2c is located at coordinates $(x_5, y_2)$ and its brightness is measured. Hereafter, in steps ST6-ST9, while the horizontal synchronous signal H is shifted by $T_x$, the brightness of the measurement region 2c at each of the locations $(x_4, y_2)$-$(x_1, y_2)$ is measured by the CCD camera 11.

Further, similarly until to step ST24, the horizontal and vertical synchronous signals are shifted by $T_x$, $T_y$ thereby the beam spot 5b is shifted by $L_x$, $L_y$. As a result, the measurement region 2c is located sequentially at each of the coordinates $(x_1, y_3)$ -$(x_5, y_5)$, and the brightness of the measurement region 2c in each position is measured.

Figure 1:
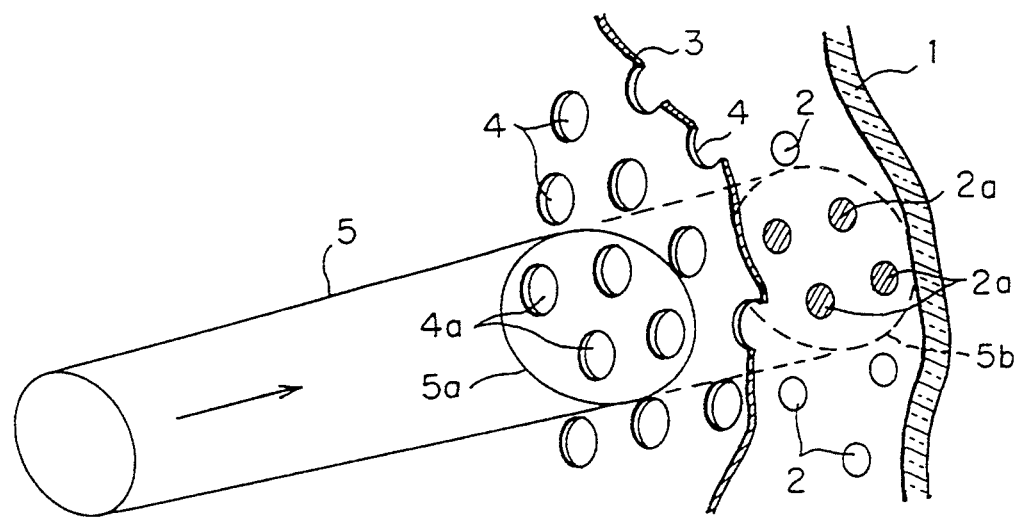
FIG. 1 is a perspective view of the inside of a CRT to a measuring method for beam spot luminescence distribution in the prior art.
Figure 2:
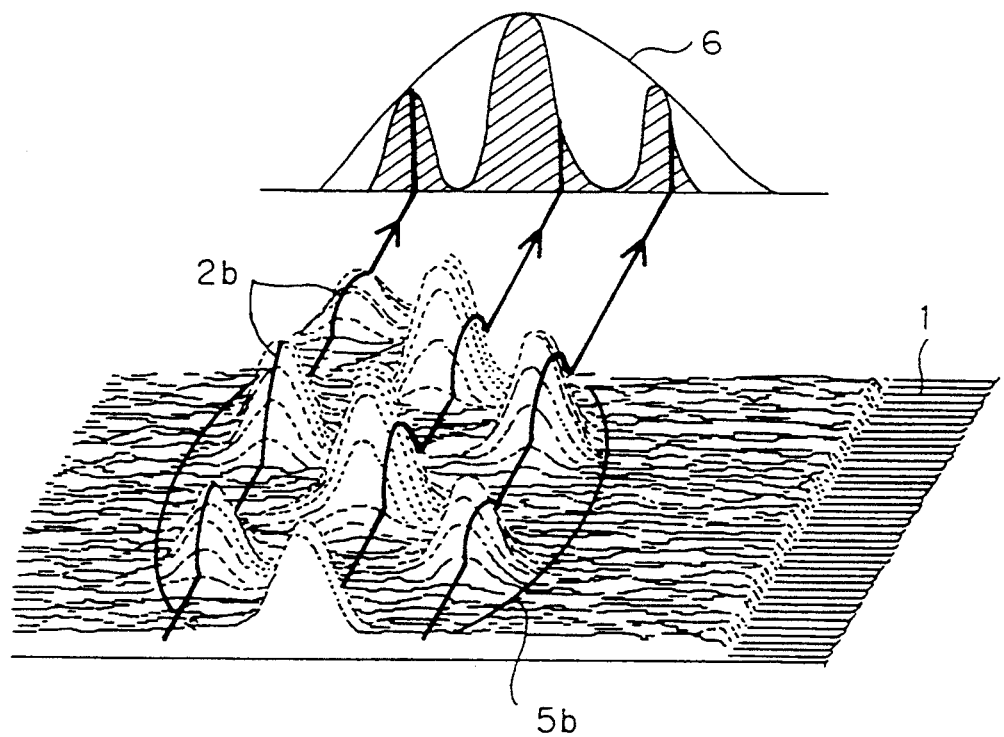
FIG. 2 is a characteristic diagram for the brightness distribution obtained by the measuring method in the prior art.
Figure 3A:
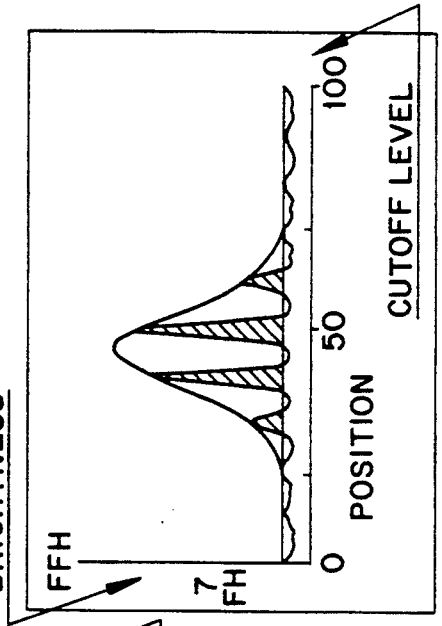
FIGS. 3A–3C are diagrams indicating standard data used for estimation of the beam spot.
Figure 3B:
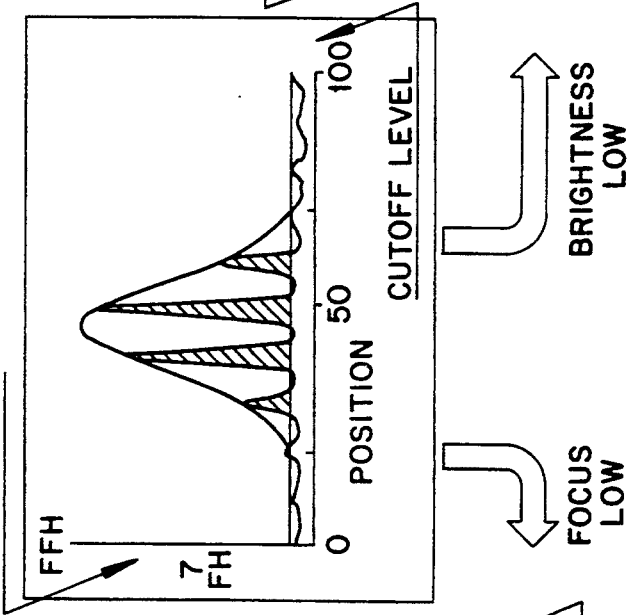
Figure 3C:
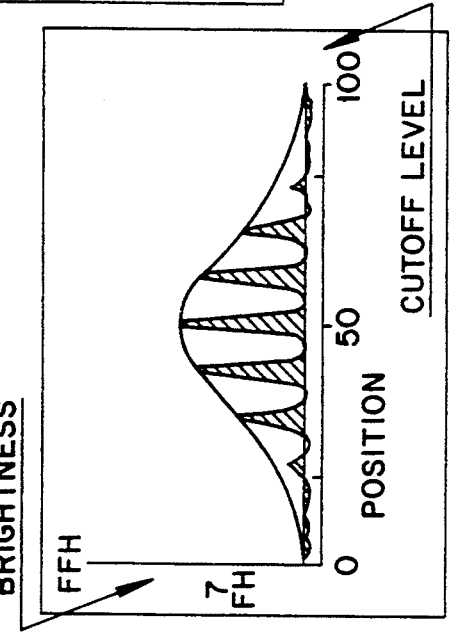

According to the above processing, twenty-four sampling data can be obtained within the same beam spot 5b. Steps ST3, ST7, ST8 and ST10-ST23 are omitted in FIG. 7 . Using the sampling data, the luminescence distribution can be obtained, for example, by the method shown in FIG. 3.

Figure 8:
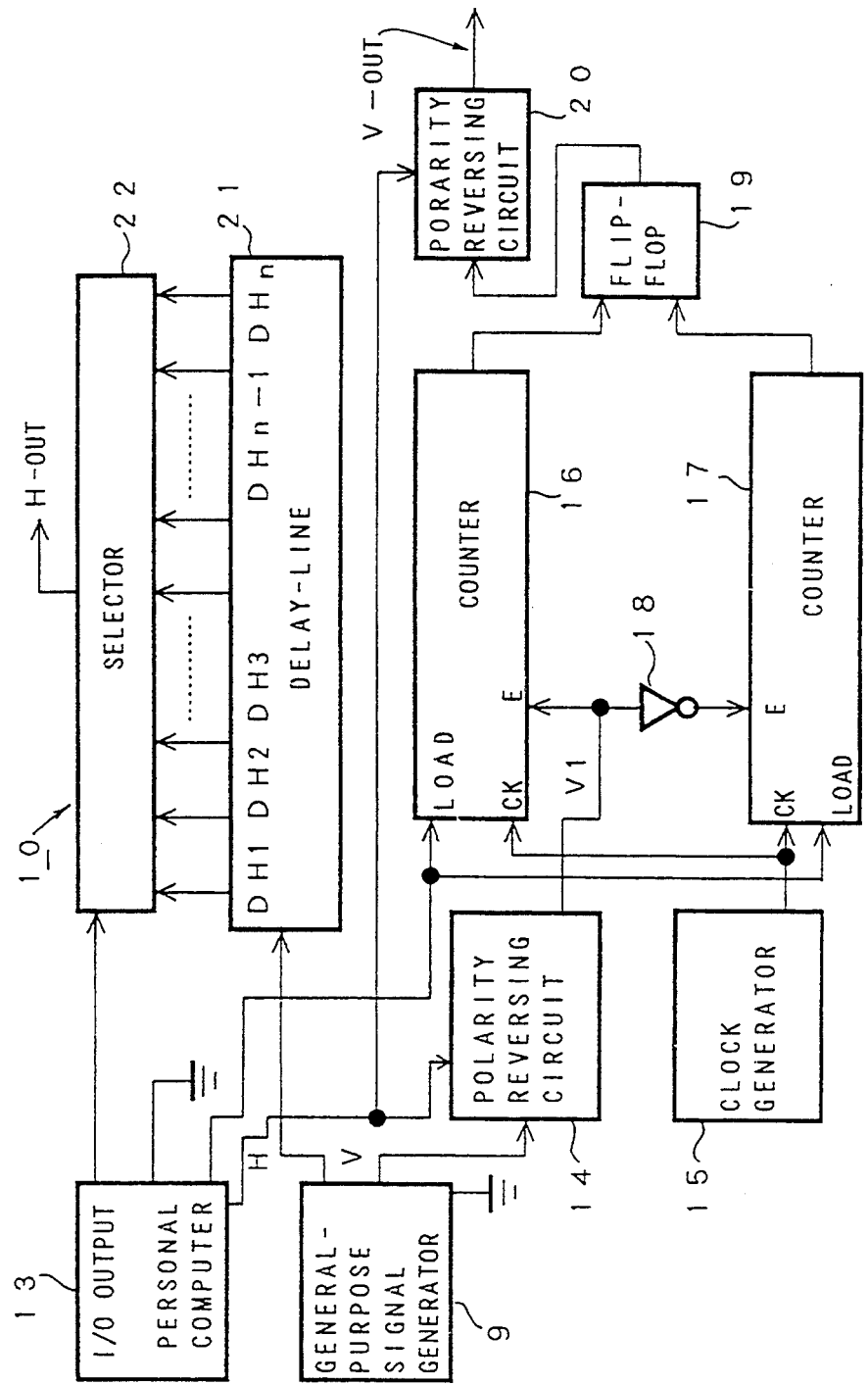
FIG. 8 is a block diagram of the synchronous signal phase control device shown in FIG. 5.

In FIG. 8, there is shown a polarity reversing circuit 14 for reversing the polarity of the vertical synchronous signal V derived from a general-purpose signal generator 9 when the polarity is negative, and for making the signal V pass intact when the polarity is positive, the polarity reversing circuit 14 being controlled by a computer 13. A clock generator 15 generates clock pulses of 10 MHz for example. A pair of counters 16, 17 count the clock pulses and are supplied with preset values from the computer 13 . The counter 17 starts to count at the rise of the vertical synchronous signal $V_1$ having positive polarity from the polarity reversing circuit 14. The counter 17 starts to count at a rising edge of the inverted signal of the vertical synchronous signal $V_1$by the inverter 18, that is, at a falling edge of the vertical synchronous signal $V_1$.

A flip-flop 19 is triggered by carry pulses of the counters 16, 17. A polarity reversing circuit 20 inverts the output pulse of the flip-flop 19 according to the computer 13, and makes the output pulse a vertical synchronous signal V-OUT.

A display line 21 delays a horizontal synchronous signal H received from the general-purpose signal generator 9 sequentially e.g., every 1 nsec, and outputs delayed horizontal synchronous signals $DH_1$, $DH_2$, . . . $DH_n$. A selector 22 selects one of the delayed horizontal synchronous signals $DH_1$-$DH_n$ obtained from the delay line 21 in response to a command of the computer 13, and makes it a horizontal synchronous signal H-OUT.

Assuming that the diameter of the beam spot 5b is approximately 10-60 nsec calculated in terms of the horizontal scanning time, it is necessary to delay the phase of the horizontal synchronous signal by the amount of $T_x$= 1-several tons of nsec. The delay line 21 can remove the horizontal synchronous signals $DH_1$-$DH_n$having their phases delayed 1 nsec by 1 nsec from the n output terminals. FIG. 9 indicates an example of the horizontal synchronous signal $DH_1$ being delayed by 1 nsec with respect to the original horizontal synchronous signal H.

The computer 13 controls the selector 22 so that one horizontal synchronous signal having a delay amount corresponding to the number of desired sampling data is selected among the delayed horizontal synchronous signals $DH_1$-$DH_n$. The selected horizontal synchronous signal H-OUT is added to the deflecting circuit of the CRT 8.

The vertical synchronous signal V derived from the general-purpose generator 9 has positive polarity or negative polarity. In the case of the negative polarity, the vertical synchronous signal V is inverted by the polarity reversing circuit 14, and in the case of the positive polarity, the signal V passes intact. Thereby the vertical synchronous signal $V_1$ having positive polarity as shown in FIG. 10 can be obtained. The counters 16, 17 are supplied with preset values from the computer 13 corresponding to desired shifting amount $T_y$ of the vertical synchronous signal $V_1$.

The counter 16 starts counting from the preset value with at the rising edge of the vertical synchronous signal $V_1$. After counting N clock pluses corresponding to the preset value, carry pulses are outputted and the flip-flop 19 is reversed and its output rises.

Next, when the vertical synchronous signal $V_1$ falls, the counter 17 starts counting from the preset value through the inverter 18. After counting N clock pulses corresponding to the preset value, carry pulses are outputted and the output of the flip-flop 19 falls. As a result, the output pulse of the flip-flop 19 becomes a pulse of positive polarity having the same pulse width as the vertical synchronous signal $V_1$ and shifted phases.

When the deflecting circuit is operated by the vertical synchronous signal of positive polarity, the output pulse of the flip-flop 19 passes intact through the polarity reversing circuit 20 and becomes the vertical synchronous signal V-OUT. Also when the deflecting circuit is operated by the vertical synchronous signal of negative polarity, the output pulse is inverted by the polarity reversing circuit 20 and becomes the vertical synchronous signal V-OUT which is sent to the deflecting circuit.

Further, the vertical synchronous signal V-OUT can be made by the delay lines similarly to the horizontal synchronous signal, but in order to move the beam spot in the vertical direction by an amount equal to its diameter, the vertical synchronous signal must be delayed by about 10 $\mu$sec-60 $\mu$sec and therefore requires many delay line elements.

As mentioned above, in the measuring method according to the present invention, the electron beam is moved to a plurality of positions while a phase of the synchronous signal provided to the deflecting circuit of the CRT is controlled. The method comprises the steps of moving the electron beam so that one Specific measurement region always exists within the beam spot, and measuring the brightness of the measurement region in each of the plural positions.

Also a measuring device according to the present invention comprises a synchronous signal phase control device for controlling the phase of the synchronous signal provided to the deflecting circuit so as to move the electron beam to a plurality of positions while the measurement region of the brightness set within one fluorescent substance selected in the tube surface of the CRT always exists within the beam spot of the electron beam. Also, the device includes means for measuring the brightness of the measurement region in each position of the electron beam.

According to the present invention, a large amount of brightness data can be sampled within the beam spot. Therefore the luminescence distribution of the beam spot can be measured with high accuracy and the focus and the resolution for the picture displayed on the CRT can be measured with high accuracy.

What is claimed is:

1. A measuring device wherein a luminescence distribution within a beam spot of an electron beam irradiating a tube surface of a color cathode ray tube is measured, said measuring device comprising:

an electron beam moving means for varying locations irradiated by the electron beam while maintaining a measurement region of brightness defined within a specific fluorescent substance on said tube surface within the beam spot, said electron beam moving means including
a synchronous signal phase control device for varying phases of synchronous signals provided to a deflecting circuit of the cathode ray tube, and
a control circuit for supplying said synchronous signal phase control device with a command signal in response to a phase amount corresponding to each irradiated location of the electron beam; and
means for measuring the brightness of said measurement region at each irradiated position of the electron beam
wherein said synchronous signal phase control device comprises:
means for shifting a phase of a reference horizontal synchronous signal in response to a first command signal from the control circuit, and
means for shifting a phase of a reference vertical synchronous signal in response to a second command signal from the control circuit
wherein said means for shifting the phase of the reference horizontal signal comprises:
a delay line for shifting a phase of the reference horizontal synchronous signal by a prescribed quantity and generating a plurality of delayed horizontal synchronous signals, and
a selector for selecting one delayed synchronous signal in response to the first command signal, and
wherein said means for shifting a phase of the reference vertical synchronous signal comprises:
a first counter for starting counting from a rising edge of the reference vertical synchronous signal and for counting reference pulses corresponding to a first phase deviation quantity indicated by the second command signal,
a second counter for starting counting from a falling edge of the reference vertical synchronous signal and for counting reference pulses corresponding to a second phase deviation quantity, and
a flip-flop set by an output of said first counter and reset by an output of said second counter.

* * * * *